United States Patent
Yang

(10) Patent No.: US 10,228,589 B2
(45) Date of Patent: Mar. 12, 2019

(54) BACKLIGHT UNIT AND LIQUID CRYSTAL DISPLAY DEVICE INCLUDING THE SAME

(71) Applicant: LG Display Co., Ltd., Seoul (KR)

(72) Inventor: ShinWoo Yang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/290,138

(22) Filed: Oct. 11, 2016

(65) Prior Publication Data
US 2017/0153499 A1    Jun. 1, 2017

(30) Foreign Application Priority Data
Nov. 26, 2015   (KR) .................. 10-2015-0166162

(51) Int. Cl.
*G02F 1/1333* (2006.01)
*G02F 1/1335* (2006.01)

(52) U.S. Cl.
CPC .. *G02F 1/133605* (2013.01); *G02F 1/133606* (2013.01); *G02F 1/133608* (2013.01); *G02F 1/133603* (2013.01); *G02F 1/133611* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,973,872 B2 * | 7/2011 | Kim | .................. | G02F 1/133606 349/58 |
| 2003/0234896 A1 * | 12/2003 | Kim | .................. | G02F 1/133604 349/65 |
| 2006/0181867 A1 * | 8/2006 | Choi | ...................... | G02B 3/005 362/97.2 |
| 2008/0089061 A1 * | 4/2008 | Hsieh | ................ | G02F 1/133608 362/235 |
| 2008/0123019 A1 * | 5/2008 | Oku | .......................... | F21V 5/02 349/64 |
| 2009/0161345 A1 * | 6/2009 | Hsu | ................... | G02F 1/133606 362/97.2 |
| 2010/0002436 A1 * | 1/2010 | Seo | .......................... | G02B 1/12 362/246 |

(Continued)

FOREIGN PATENT DOCUMENTS

| JP | 2004-235103 | * | 8/2004 | .......... G02F 1/1333 |
|---|---|---|---|---|
| JP | 2004235103 A | | 8/2004 | |

(Continued)

OTHER PUBLICATIONS

LG Display Co., Ltd, Backlight Unit and Liquid Crystal Display Device Having the Same, Machine Translation of KR 10-2010-0064254 A from KIPO website, All pages.*

*Primary Examiner* — Sang V Nguyen
(74) *Attorney, Agent, or Firm* — Morgan, Lewis & Bockius LLP

(57) ABSTRACT

A backlight unit includes a bottom cover; a plurality of light sources in the bottom cover; a guide panel on an outer circumference of the bottom cover; a reflecting portion on at least one of the bottom cover and the guide panel and configured to reflect light from the light sources; and a diffuser plate supported by the guide panel. A convex pattern is on an upper surface of the reflecting portion or a lower surface of the diffuser plate to maintain an interval between the diffuser plate and the guide panel or the reflecting portion.

14 Claims, 5 Drawing Sheets

(56) References Cited

U.S. PATENT DOCUMENTS

| | | | | |
|---|---|---|---|---|
| 2012/0057100 A1* | 3/2012 | Masuda | ............ | B29C 33/3878 |
| | | | | 349/62 |
| 2013/0050991 A1* | 2/2013 | Kuroda | ............ | G02F 1/133606 |
| | | | | 362/97.1 |
| 2014/0218625 A1* | 8/2014 | Kuromizu | ............... | H04N 5/66 |
| | | | | 348/790 |

FOREIGN PATENT DOCUMENTS

| KR | 20060023099 A | 3/2006 |
|---|---|---|
| KR | 20100064254 A | 6/2010 |
| KR | 20100108003 A | 10/2010 |
| KR | 20150074497 A | 7/2015 |

* cited by examiner

FIG. 7A
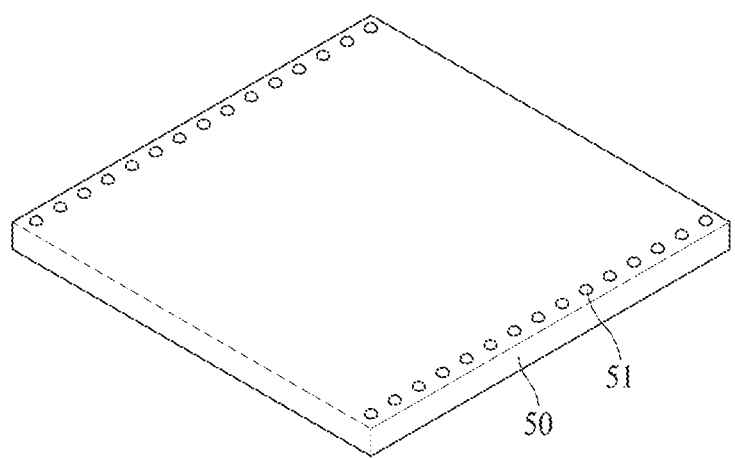
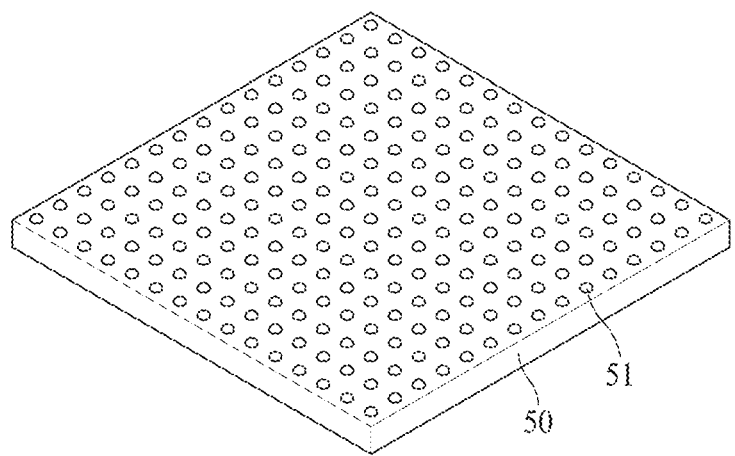
FIG. 7B

BACKLIGHT UNIT AND LIQUID CRYSTAL DISPLAY DEVICE INCLUDING THE SAME

CROSS REFERENCE TO RELATED APPLICATIONS

This application claims the benefit of the Korean Patent Application No. 10-2015-0166162 filed on Nov. 26, 2015, which is hereby incorporated by reference for all purposes as if fully set forth herein.

BACKGROUND OF THE INVENTION

Field of the Invention

The present invention relates to a backlight unit and a liquid crystal display device including the same, and more particularly, to a direct type backlight unit and a liquid crystal display device including the same.

Discussion of the Related Art

Portable electronic devices, such as mobile terminals and notebook computers, typically include flat panel display devices. Liquid crystal display devices, plasma display panels, field emission display devices, light emitting diode display devices, and organic light emitting diode display devices have been studied as examples of the flat panel display device. Among flat panel display devices, the liquid crystal display device has advantages, such as a highly-developed mass-production technology, comparatively easy driving, low power consumption, high definition resolution, and large screen size.

Since liquid crystals do not emit light, a liquid crystal display device includes a separate light source, such as a backlight unit provided with light-emitting diodes (LED) on a rear surface to irradiate light toward the surface of the liquid crystal panel in order to display an identifiable image. Backlight units may be categorized into direct-type backlight units and edge-type back light units. In a direct-type backlight unit, light sources are arranged below a liquid crystal panel. In an edge-type backlight unit, a light source is arranged to face a side of a light guide plate and a plurality of optical sheets are arranged between the liquid crystal panel and the light guide plate.

FIG. 1 is a cross-sectional view illustrating a related art direct-type backlight unit.

As shown in FIG. 1, according to the related art direct type backlight unit, a reflector 3 and a plurality of light sources 4 are disposed in a bottom cover 1, and a diffuser plate 5 and a plurality of optical sheets 6 are supported by a guide panel 2 disposed on the bottom cover 1. As such, light generated from the plurality of light sources 4 is scattered and refracted through the diffuser plate 5 and the optical sheets 6 to be diffused toward an entire surface of a liquid crystal panel (not shown).

The liquid crystal display device that includes the related art backlight unit as shown in FIG. 1 has problems as follows.

The diffuser plate 5 of the related art backlight unit is disposed to be supported in direct contact with the guide panel 2. Therefore, the light generated from the plurality of light sources 4 cannot move toward the area where the diffuser plate 5 is in contact with the guide panel 2, thereby causing a dark area at a corresponding area.

Further, according to the recent trend, the need of development of a liquid crystal display device having a narrow bezel has been increased. In the related art liquid crystal display device, the area where the diffuser plate 5 is in contact with the guide panel 2 may be covered by a bezel. However, as a bezel width becomes narrow, some of the area where the diffuser plate 5 is in contact with the guide panel 5 may not be covered by the bezel, thus a problem comes up in that a dark portion D occurs at an edge area of the liquid crystal panel, as shown in FIG. 1.

As described above, according to the related art direct type liquid crystal display device, a problem arises in that a dark portion occurs at an edge area of the liquid crystal panel due to a non-uniform supply of light.

Also, the need of a display device having an ultra-large sized area has been increased as technology advances. A technology called a videowall or multivision display device for realizing an ultra-large sized screen using a plurality of display devices has been developed because it is difficult to realize an ultra-large sized screen of 100 inches or more through one display device.

The videowall or multivision display device is a display device that realizes a large sized screen by continuously arranging a plurality of display devices in horizontal and/or vertical directions. In this way, the multivision display device displays different images in each unit display device or displays one image in each unit display device by dividing one image into serval images.

When an image is displayed, the more important image portion is usually a center area of the display device, and a less important image portion is at an edge area of the display device. Therefore, when an image displayed in each unit display device of a multivision display device, a dark portion may occurs at the edge area of the corresponding unit display device, which would be at a center area of the multivision display device. Thus, there may be a problem in that the image portion at the center area, which may be a more important image portion, is deteriorated.

As described above, when an image is divided and displayed through each unit display device of the multivision display device, a dark portion may occur in the important center image portion, and a user may deem the dark area as a shortcoming in the quality of the display device.

SUMMARY

Accordingly, the present invention is directed to a backlight unit and a liquid crystal display device including the same, which substantially obviate one or more problems due to limitations and disadvantages of the related art.

An object of the present invention is to provide a backlight unit and a liquid crystal display device including the same in which an image having uniform luminance is provided on an entire area of a liquid crystal panel by reducing occurrence of a dark portion at an edge area of the liquid crystal panel, which is caused by a narrow bezel.

Another object of the present invention is to provide a backlight unit and a liquid crystal display device including the same in which an image having uniform luminance is provided on an entire area of a multivision display device by reducing occurrence of a dark portion at each edge area of a liquid crystal display device constituting the multivision display device.

Additional features and advantages of the invention will be set forth in the description which follows, and in part will be apparent from the description, or may be learned by practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit comprises a bottom cover; a plurality of light sources in the bottom cover; a guide panel on an outer circumference of the bottom cover; a reflecting portion on at least one of the bottom cover and the guide panel and configured to reflect light from the light sources; and a diffuser plate supported by the guide panel, wherein a convex pattern is on an upper surface of the reflecting portion or a lower surface of the diffuser plate to maintain an interval between the diffuser plate and the guide panel or the reflecting portion.

In another aspect, a backlight unit comprises a bottom cover; light sources in the bottom cover; a guide panel on an outer circumference of the bottom cover; and a diffuser plate supported by the guide panel, wherein a convex pattern is on a lower surface of the diffuser plate to maintain an interval between the guide panel and the diffuser plate.

In another aspect, a liquid crystal display device comprises a backlight unit including a bottom cover, a plurality of light sources in the bottom cover, a guide panel on an outer circumference of the bottom cover, a reflecting portion on at least one of the bottom cover and the guide panel and configured to reflect light from the light sources, and a diffuser plate supported by the guide panel; and a liquid crystal panel configured to display an image using light irradiated from the backlight unit, wherein a convex pattern is on an upper surface of the reflecting portion or a lower surface of the diffuser plate to maintain an interval between the diffuser plate and the guide panel or the reflecting portion.

In another aspect, a liquid crystal display device, comprises a backlight unit including a bottom cover, light sources in the bottom cover, a guide panel on an outer circumference of the bottom cover, and a diffuser plate supported by the guide panel, and a liquid crystal panel configured to display an image using light irradiated from the backlight unit, wherein a convex pattern is on a lower surface of the diffuser plate to maintain an interval between the guide panel and the diffuser plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings:

FIGS. 7A and 7B are views illustrating diffuser plates according to example embodiments of the present invention.

DETAILED DESCRIPTION

Figure 1:
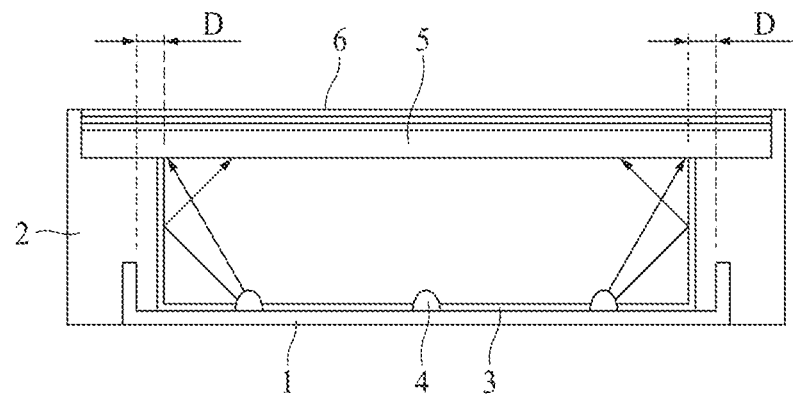
FIG. 1 is a cross-sectional view illustrating a related art direct-type backlight unit.

Advantages and features of the present invention, and implementation methods thereof will be clarified through the following embodiments described with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. Further, the present invention is defined only by the scope of claims.

Any shape, size, ratio, angle, or number disclosed in the drawings for describing embodiments of the present invention is merely an example, and thus, the present invention is not limited to the illustrated details. Like reference numerals refer to like elements throughout. In the following description, when the detailed description of a relevant known element, function, or configuration is determined to unnecessarily obscure the disclosed embodiments, that item's detailed description may be omitted. Where "comprise," "have," and "include" are used in the present specification, one or more additional parts may be included unless "only" is used. A term described in the singular form also refers to the term's plural form absent indications to the contrary.

Elements should be construed as including an error range or tolerance even if there is no explicit mention of such an error range or tolerance.

In describing a position relationship, for example, when the position relationship is described as 'upon~', 'above~', 'below~', and 'next to~', one or more portions may be arranged between two other portions unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element without departing from the scope of the present invention.

Features of various embodiments may be partially or overall coupled to or combined with each other, and may be variously inter-operated with each other and driven technically as those skilled in the art can understand. The disclosed embodiments may be implemented independently from each other, or may be implemented together in a co-dependent relationship.

Hereinafter, embodiments will be described in detail with reference to the accompanying drawings.

Figure 2:
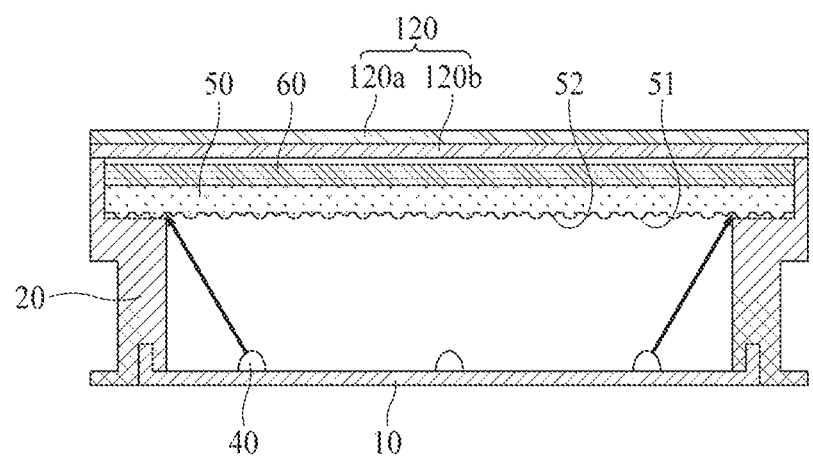
FIG. 2 is a cross-sectional view illustrating a liquid crystal display device that includes a backlight unit according to a first example embodiment of the present invention.

FIG. 2 is a cross-sectional view illustrating a liquid crystal display device that includes a backlight unit according to a first example embodiment of the present invention.

As shown in FIG. 2, a backlight unit may include a plurality of light sources 40 disposed in a bottom cover 10, providing light toward a liquid crystal panel 120, a diffuser plate 50 and a plurality of optical sheets 60 for scattering and refracting the light provided from the light sources 40 in order to diffuse the light toward an entire surface of the liquid crystal panel 120, and a guide panel 20 disposed on the bottom cover 10 on an outer circumference of the bottom cover 10, supporting the diffuser plate 50 and the plurality of optical sheets 60. The light sources 40 may be, but not limited to, hemisphere shaped LEDs.

Particularly, a convex pattern 51 is disposed on a lower surface of the diffuser plate 50 as shown in the example of FIG. 2, and a predetermined interval is maintained between the guide panel 20 and the diffuser plate 50 by the convex pattern 51.

In the present description, the upper surface may refer to a surface facing the liquid crystal panel 120 and the lower surface may refer to a surface that does not face the liquid crystal panel 120, unless restricted separately. Therefore, the lower surface of the diffuser plate 50 refers to the surface that does not face the liquid crystal panel 120.

According to the related art, since the diffuser plate directly contacts the guide panel and is supported by the guide panel, light cannot reach the area where the diffuser plate and the guide panel are in contact with each other. Thus, a problem occurs in that a dark portion occurs at an edge area of the liquid crystal panel. To solve this problem, a predetermined interval is maintained between the guide panel 20 and the diffuser plate 50 to move the light to the corresponding interval to reduce an occurrence of a dark portion at the edge area of the liquid crystal panel 120. The predetermined interval may refer to a minimum interval where light may move between the guide panel 20 and the diffuser plate 50, and its value may be varied depending on properties of the light sources 40.

In this embodiment of the present invention, the convex pattern 51 has a height of 1 mm to 2 mm to maintain the predetermined interval between the guide panel 20 and the diffuser plate 50. More particularly, the convex pattern 51 may be formed on the lower surface of the diffuser plate 50 such that the diffuser plate 50 is extruded using a roller (not shown) that includes a concave pattern corresponding to the convex pattern 51. However, the present invention is not limited to this case, and the convex pattern 51 may be formed in various manners.

Also, the diffuser plate 50 may further include an auxiliary pattern 52 disposed on its lower surface to assist diffusion of light by controlling a light scattering angle, as shown in FIG. 2. That is, since the auxiliary pattern 52 is not intended to maintain the interval between the guide panel 20 and the diffuser plate 50 unlike the convex pattern 51, the auxiliary pattern 52 is not required to be disposed at a large size unlike the convex pattern 51, and may have a height of 7 μm to 10 μm smaller than that of the convex pattern 51. Also, since the auxiliary pattern 52 is not always required to be disposed in a convex shape like the convex pattern 510, the auxiliary pattern 52 may be disposed in a concave pattern that may disperse light, or other various patterns.

As described above, the convex pattern 51 is disposed on the lower surface of the diffuser plate 50 supported by the guide panel 20 to maintain the predetermined interval between the guide panel 20 and the diffuser plate 50 to move the light to the corresponding interval. Therefore, occurrence of the dark portion at the edge area of the liquid crystal panel 120 may be reduced.

Also, in the liquid crystal display device that includes a backlight unit, the liquid crystal panel 120 that includes the upper substrate 120a and the lower substrate 120b is supported by the uppermost portion of the guide panel 20. Here, a case top disposed in a rectangular frame shape to cover the upper surface and the side of the liquid crystal panel 120 is removed to realize a narrow bezel. Particularly, a resin is deposited on the uppermost portion of the guide panel 20 provided in an aluminum extrusion method, and the guide panel 20 and the liquid crystal panel 120 are bonded to each other through the resin, thereby fixing the liquid crystal panel 120 without a case top.

Figure 3:
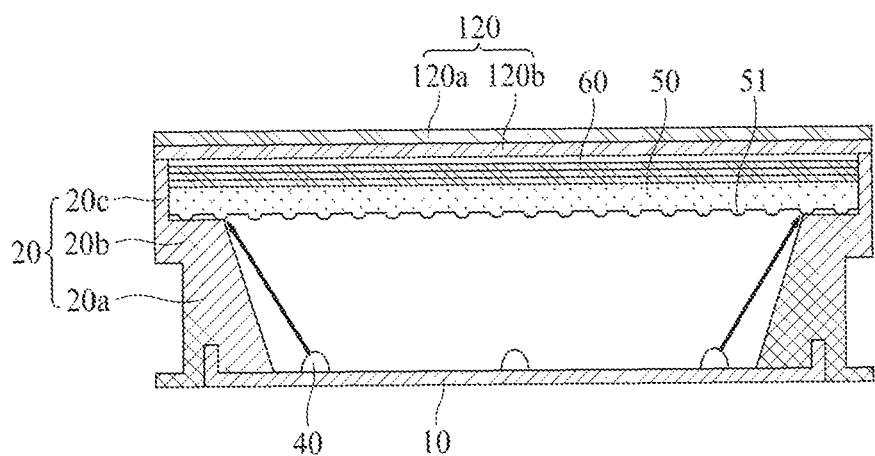
FIG. 3 is a cross-sectional view illustrating a liquid crystal display device that includes a backlight unit according to a second example embodiment of the present invention.

FIG. 3 is a cross-sectional view illustrating a liquid crystal display device that includes a backlight unit according to a second example embodiment of the present invention, and the liquid crystal display device of FIG. 3 is similar to the liquid crystal display device of FIG. 2 except that the shape of the guide panel 20 is modified. Therefore, the same reference numbers will be used throughout the drawings to refer to the same or like parts, and elements different from those of FIG. 2 will only be described.

As shown in FIG. 3, the guide panel 20 includes an inclined portion 20a disposed at a predetermined angle with respect to a lower surface of the bottom cover 10, a horizontal portion 20b disposed in parallel with the lower surface of the bottom cover 10, and a vertical portion 20c disposed vertically with respect to the lower surface of the bottom cover 10. The diffuser plate 50 is supported by the inclined portion 20a and the horizontal portion 20b, and the liquid crystal panel 120 is supported by the vertical portion 20c of the guide panel 20.

That is, as shown in FIG. 2, if the side of the guide panel 20 is disposed vertically with respect to the lower surface of the bottom cover 10, deviation may be generated between light supplied to the edge area of the liquid crystal panel 120 and light supplied to the other area of the liquid crystal panel 120. Therefore, in the second example embodiment of FIG. 3, the guide panel 20 may be disposed with the inclined portion 20a to change a path of light generated from the light sources 40 to increase light supplied to the edge area of the liquid crystal panel 120.

Here, the predetermined angle of the inclined portion 20a with respect to the lower surface of the bottom cover 10 may be set by reflecting a light pointing angle of the light sources 40 and a distance between the light sources 10 and the guide panel 20. Also, the guide panel 20 may be disposed by integrating a support side and a guide panel that are included in the liquid crystal display device with each other. That is, in the liquid crystal display device of the related art, a support side for supporting a diffuser plate and optical sheets exists separately from a guide panel for supporting the liquid crystal panel. However, in the example embodiment of the present invention, the support side and the guide panel may be disposed in a single body.

More particularly, the guide panel 20 of FIG. 3 may be formed through aluminum extrusion, the diffuser plate 50 and the optical sheets 60 may be supported by the inclined portion 20a and the horizontal portion 20b of the guide panel 20, sides of the diffuser plate 50 and the optical sheets 60 may be surrounded by the vertical portion 20c of the guide panel 20, and the liquid crystal panel 120 may be supported by the vertical portion 20c of the guide panel 20. Therefore, movement of the liquid crystal panel 120 may be avoided without a case top.

As described above, the convex pattern 51 is disposed on a lower surface of the diffuser plate 50 supported by the guide panel 20 to maintain the predetermined interval between the guide panel 20 and the diffuser plate 50 to move light to the corresponding interval. As a result, occurrence of the dark portion at the edge area of the liquid crystal panel 120 may be reduced, and the guide panel 20 may be disposed with the inclined portion 20a to change a path of the light generated from the light sources 40, whereby light supplied to the edge area of the liquid crystal panel 120 may be increased and thus uniform light may be provided to the liquid crystal panel 120.

Figure 4:
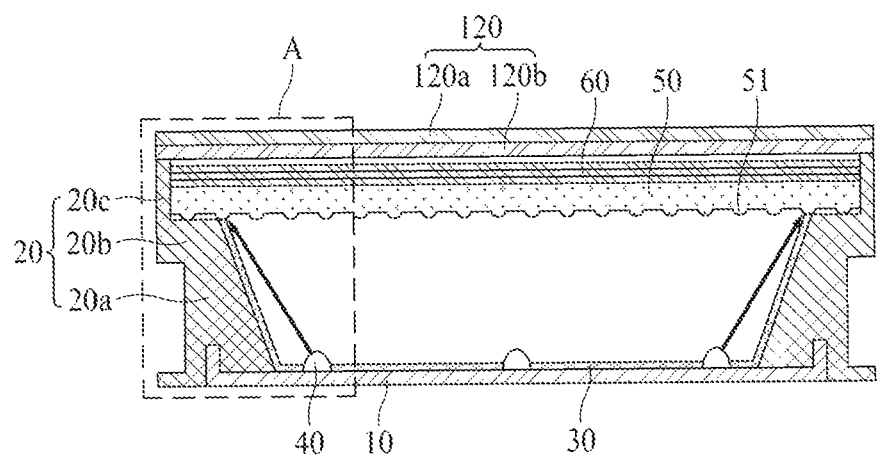
FIG. 4 is a cross-sectional view illustrating a liquid crystal display device that includes a backlight unit according to a third example embodiment of the present invention.

FIG. 4 is a cross-sectional view illustrating a liquid crystal display device that includes a backlight unit according to a third example embodiment of the present invention. The liquid crystal display device of FIG. 4 is similar to the aforementioned liquid crystal display device, which includes a backlight unit, according to FIG. 3 except that a reflecting portion 30 is additionally provided. Therefore, the same reference numbers will be used throughout the drawings to refer to the same or like parts, and elements different from those of FIG. 3 will only be described.

As shown in FIG. 4, the reflecting portion 30, which reflects light of the light sources 40 toward the liquid crystal panel 120, is included on the bottom cover 10 and/or the guide panel 20 according to the third embodiment of the present invention. Here, the reflecting portion 30 may be provided such that the light sources 40 are disposed on the bottom cover 10 and then a reflector having an opening is deposited on an area corresponding to the light sources 40.

As described above, the reflecting portion 30 is additionally disposed on the bottom cover 10 and/or the guide panel 20 to avoid light efficiency deterioration caused by light irradiated from the light sources 40 being absorbed in the bottom cover 10 or the guide panel 20 without being reflected therein. Thus, the light reflecting portion 30 increases the amount of light moving toward the liquid crystal panel 120. Further, the reflecting portion 30 may be disposed on the inclined portion 20a of the guide panel 20.

Therefore, because the convex pattern 51 is disposed on the lower surface of the diffuser plate 50 supported by the guide panel 20 in a manner similar to that shown in FIG. 3, the predetermined interval is maintained between the guide panel 20 and the diffuser plate 50 to move the light to the corresponding interval. Thus, the occurrence of the dark portion caused at the edge area of the liquid crystal panel 120 may be reduced. Also, the reflecting portion 30 may be disposed on the bottom cover 10 and/or the guide panel 20 to increase efficiency of the amount of light moving to the liquid crystal panel 120.

Figure 5:
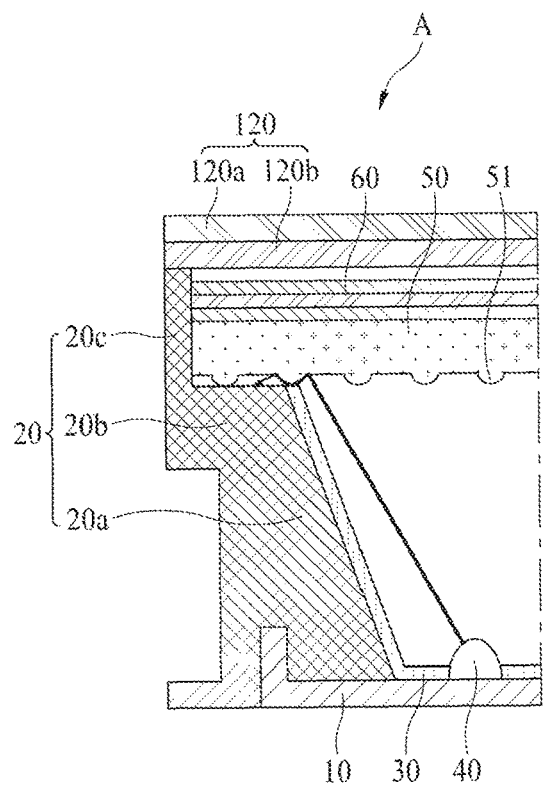
FIG. 5 is an enlarged cross-sectional view of area "A" in FIG. 4 illustrating a liquid crystal display device that includes a backlight unit.

FIG. 5 is an enlarged cross-sectional view of area "A" in FIG. 4 illustrating a liquid crystal display device that includes a backlight unit.

With reference to FIG. 5, the convex pattern 51 is disposed on the lower surface of the diffuser plate 50 to maintain the predetermined interval between the guide panel 20 and the diffuser plate 50. Also, as shown in FIG. 5, because the light generated from the light sources 40 may move to the interval between the guide panel 20 and the diffuser plate 50, occurrence of the dark portion may be reduced because light can better reach the area where the guide panel 20 is in contact with the diffuser plate 50.

Figure 6:
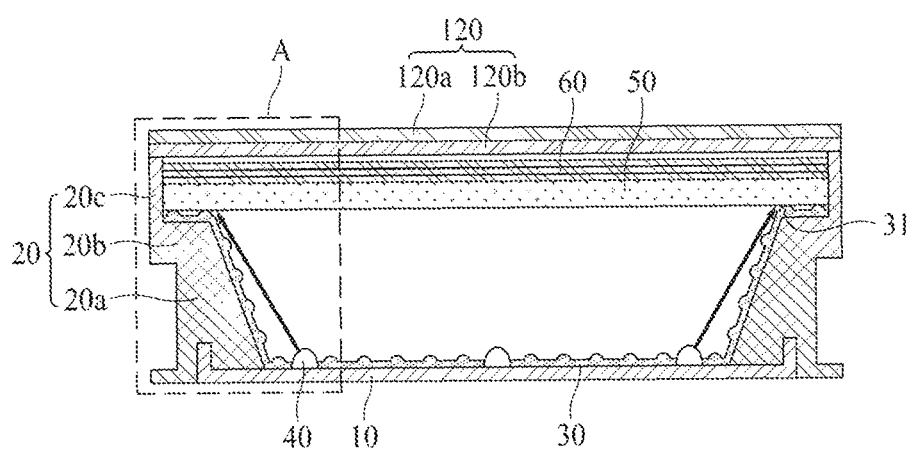
FIG. 6 is a cross-sectional view illustrating a liquid crystal display device that includes a backlight unit according to a fourth example embodiment of the present invention.

FIG. 6 is a cross-sectional view illustrating a liquid crystal display device that includes a backlight unit according to a fourth example embodiment of the present invention. The liquid crystal display device of FIG. 6 is similar to the aforementioned liquid crystal display device of FIG. 4 except for structures of the diffuser plate 50 and the reflecting portion 30. Therefore, the same reference numbers will be used throughout the drawings to refer to the same or like parts, and elements different from those of FIG. 4 will only be described.

As shown in FIG. 6, the reflecting portion 30 is disposed on the inclined portion 20a and the horizontal portion 20b of the guide panel 20, and a convex pattern 31 is disposed on an upper surface of the reflecting portion 30 to maintain the predetermined interval between the reflecting portion 30 and the diffuser plate 50. That is, because the reflecting portion 30 is disposed on the horizontal portion 20b of the guide panel 20, the diffuser plate 50 is in contact with the reflecting portion 30 without being directly in contact with the guide panel 20.

Therefore, the convex pattern 31 is disposed on the upper surface of the reflecting portion 30 to maintain the predetermined interval between the reflecting portion 30 and the diffuser plate 50, thus occurrence of the dark portion at the area where the reflecting portion 30 is in contact with the diffuser plate 50 may be reduced. Here, the convex pattern 31 may be disposed on the upper surface of the reflecting portion 30 such that a bead is coated on the reflecting portion 30. However, the present invention is not limited to this case, and the convex pattern 31 may be formed in various manners.

Although the convex pattern 31 is disposed on the upper surface of the reflecting portion 30 in FIG. 6, the convex pattern 51 may be disposed on the lower surface of the diffuser plate 50 as shown in FIGS. 2 to 4 to maintain the predetermined interval between the reflecting portion 30 and the diffuser plate 50. Particularly, the convex pattern 31 may be maintained on the upper surface of the reflecting portion 30 or the convex pattern 51 may be maintained on the lower surface of the diffuser plate 50 are intended to maintain the predetermined interval between the reflecting portion 30 and the diffuser plate 50. But, their size requirements may not be the same as each other. That is, since the reflecting portion 30 is disposed of a material of higher reflectivity than that of the diffuser plate 50, even though the predetermined interval provided by the convex pattern 31 of the reflecting portion 30 is provided to be smaller as compared to the predetermined interval provided by the convex pattern 51 of the diffuser plate 50, light moving to the corresponding interval may be reflected with higher efficiency. Therefore, the amount of light moving to the outside of the liquid crystal panel 120 may be maintained uniformly. Therefore, the convex pattern 31 of the reflecting portion 30 may have a height lower than that of the convex pattern 51 of the diffuser plate 50. For example, the convex pattern 31 of the reflecting portion 30 may have a height of 50 μm.

Also, the reflecting portion 30 may be disposed to be extended to the side of the vertical portion 20c as well as the upper surfaces of the inclined portion 20a and the horizontal portion 20b of the guide panel 20. In this case, the light moving to the interval between the reflecting portion 30 and the diffuser plate 50 may be reflected by the reflecting portion 30 provided at the side of the vertical portion 20c and its path may be changed toward the inside of an active area, thereby further improving light efficiency. Even in the case that the reflecting portion 30 is disposed on the inclined portion 20a and the horizontal portion 20b of the guide panel 20 and at the side of the vertical portion 20c, the convex pattern 31 may be disposed on the upper surface of the reflecting portion 30 or the convex pattern 51 may be disposed on the lower surface of the diffuser plate 50 as described above to maintain the interval between the reflecting portion 30 and the diffuser plate 50.

FIGS. 7A and 7B are views illustrating diffuser plates according to example embodiments of the present invention. FIG. 7A illustrates that a convex pattern is disposed at a predetermined area on a lower surface of a diffuser plate corresponding to an area supported by a guide panel, and FIG. 7B illustrates that a convex pattern is fully disposed on a lower surface of a diffuser plate. That is, the convex pattern 51 may be disposed at a specific area only on the lower surface of the diffuser plate 50 supported by the guide panel 20 as shown in of FIG. 7A. However, the convex pattern 51 may be disposed fully on the lower surface of the diffuser plate 50 as shown in FIG. 7B to simplify the manufacturing process.

Although the diffuser plate 50 and the convex pattern 51 are shown on the lower surface of the diffuser plate 50 in the examples of FIGS. 7A and 7B, the reflecting portion 30 may have the convex pattern 31. That is, the convex pattern 31 may be disposed at a specific area only on an upper surface of the reflecting portion 30 that supports the diffuser plate 50, or may be disposed fully on the upper surface of the reflecting portion 30.

Figure 8:
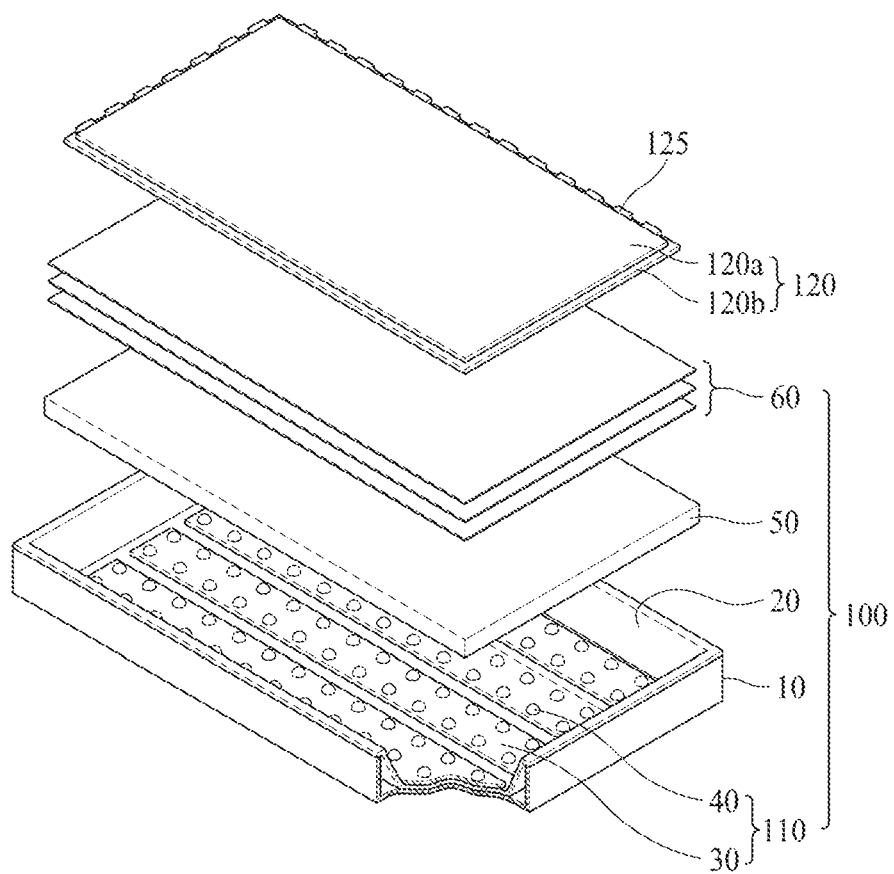
FIG. 8 is an exploded view illustrating a liquid crystal display device that includes a backlight unit according to an example embodiment of the present invention.

FIG. 8 is an exploded view illustrating a liquid crystal display device that includes a backlight unit according to an example embodiment of the present invention.

As shown in FIG. 8, the liquid crystal display device includes a liquid crystal panel 120, a backlight unit 100, and a bottom cover 10. The liquid crystal panel 120 performs a core function of image display, and includes an upper substrate 120a and a lower substrate 120b bonded to each other to face each other with a liquid crystal layer therebetween.

Although not shown in FIG. 8, a plurality of gate lines cross a plurality of data lines inside the lower substrate 120b to define pixels, and a thin film transistor (TFT) is disposed at each crossing point of the gate and data lines and one-to-one connected with a transparent pixel electrode formed in each pixel. Color filters of red (R), green (G) and blue (B) corresponding to each pixel and a black matrix may be disposed inside the upper substrate 120a, wherein the black matrix surrounds each of the color filters of red (R), green (G), and blue (B) and covers non-display elements, such as the gate lines, the data lines, and the thin film transistors. Also, a transparent common electrode covering the color filters and the black matrix is provided.

However, because the present invention is not limited to the above example, the aforementioned color filters may be provided on a TFT of the lower substrate 120b in case of a Color Filter On TFT (COT) type liquid crystal panel 120 without being formed in the upper substrate 120a.

A printed circuit board 125 is connected along at least one corner of the liquid crystal panel 120 using a connection member, such as a flexible printed circuit board (FPCB) or tape carrier package (TCP). The printed circuit board 125 may be classified into a gate driving circuit scanning and delivering on/off signals of the thin film transistor to the gate lines and a data driving circuit delivering an image signal per frame to the data lines, whereby the gate driving circuit and the data driving circuit may be disposed at two adjacent corners of the liquid crystal panel 120.

In the liquid crystal panel 120 of the aforementioned structure, if the thin film transistor selected for each gate line is turned on by the scanned and delivered on/off signal of the gate driving circuit, a signal voltage of the data driving circuit is delivered to the corresponding pixel electrode through the data line. For this reason, an alignment direction of liquid crystal molecules is varied by an electric field between the pixel electrode and the common electrode, whereby a difference in transmittance is generated.

Also, the liquid crystal display device may include a backlight unit 100 that provides light on a rear surface of the liquid crystal panel 120 to externally generate a difference in transmittance represented by the liquid crystal panel 120. The backlight unit 100 includes a light source package 110, a diffuser plate 50, a plurality of optical sheets 60, and a guide panel 20, wherein the diffuser plate 50 and the optical sheets 60 are disposed above the light source package 110, and the guide panel 20 is disposed at a side of the light source package 110. The light source package 110 includes printed circuit boards (PCBs, not shown) arranged to have constant spaced areas along an inner side in a length direction of the bottom cover 10, and a reflecting portion 30 and a plurality of light sources 40, which are packaged in each of the PCBs. Metal core PCBs having a radiating function may be used as the PCBs. A radiator may be disposed on a rear surface of the metal core PCB to externally emit heat delivered from each light source 40.

The plurality of optical sheets 60 may include various functional sheets, such as a reflective polarizing film called dual brightness enhancement film (DBEF) or a prism. Therefore, the light provided from the plurality of light sources 40 enters the liquid crystal panel 120 after sequentially passing through the diffuser plate 50 and the optical sheets 60, and the liquid crystal panel 120 may externally display an image of high luminance by using the light.

The liquid crystal panel and the backlight unit are modularized through a case top, a guide panel and a bottom cover in the liquid crystal display device of the related art. But, in example embodiments of the present invention, a modularized liquid crystal display device is provided such that a case top is removed to realize a narrow bezel and the liquid crystal panel 120 is adhered to the uppermost portion of the guide panel 20 to fix the liquid crystal panel 120. That is, as shown in the examples of FIGS. 3 and 4, the guide panel 20 is disposed with the inclined portion 20a, the horizontal portion 20b and the vertical portion 20c, the diffuser plate 50 and the optical sheets 60 are supported through the inclined portion 20a and the horizontal portion 20b, and the liquid crystal panel 120 is supported by surrounding the sides of the diffuser plate 50 and the optical sheets 60 through the vertical portion 20c.

The bottom cover 10 serves as a bottom case for receiving the backlight unit 100. To this end, each edge of the bottom cover 70 is allowed to be elevated, and the guide panel 20 is provided on the bottom cover 10, specifically on the outer circumference of the bottom cover 10, to form a predetermined space therein.

Particularly, in the embodiment of the present invention, as described above, the convex patterns 31 and 51 may be disposed on the upper surface of the reflecting portion 30 or the lower surface of the diffuser plate 50 to maintain the predetermined interval between the guide panel 20 supporting the diffuser plate 50 or the reflecting portion 30 and the diffuser plate 50, whereby uniform light may be provided to the liquid crystal panel 120 and the dark portion may be prevented from being formed at the edge area of the liquid crystal panel 120 as a bezel becomes narrow.

Also, the rectangular frame shaped guide panel 20 placed on the bottom cover 10, surrounding the edges of the liquid crystal panel 120 and the backlight unit 100, is coupled to the bottom cover 10.

Moreover, although not shown, the multivision display device according to the present invention may be provided by arranging a plurality of liquid crystal display devices in horizontal and/or vertical directions, wherein each of the plurality of liquid crystal display devices includes a backlight unit provided with a plurality of convex patterns 31 and 51 formed on the upper surface of the reflecting portion or the lower surface of the diffuser plate 50 to maintain the predetermined interval between the guide panel 20 and the diffuser plate 50 or between the reflecting portion 30 and the diffuser plate 50.

According to the example embodiments of the present invention described as above, a number of advantages may be obtained. For example, occurrence of the dark portion at the edge area of the liquid crystal panel may be reduced, whereby an image having uniform luminance may be provided on the entire surface of the liquid crystal panel. Also, if the liquid crystal display device that includes a backlight unit according to example embodiments of the present invention is applied to a multivision display device provided by arranging a plurality of liquid crystal display devices, an image having uniform luminance may be provided through all the liquid crystal display devices, whereby darkness generated in the middle of the full image may be removed.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A backlight unit, comprising:
a bottom cover;
a plurality of light sources in the bottom cover;
a guide panel on an outer circumference of the bottom cover;
a reflecting portion on at least one of the bottom cover and the guide panel and configured to reflect light from the light sources;
a diffuser plate supported by the guide panel;
a convex pattern disposed on a lower surface of the diffuser plate to maintain an interval between the diffuser plate and the guide panel or the reflecting portion; and
an auxiliary pattern disposed on the lower surface of the diffuser plate configured to scatter light irradiated from the light sources, the auxiliary pattern having a smaller size than that of the convex pattern,
wherein the convex pattern and the auxiliary pattern are alternately arranged on the lower surface of the diffuser plate with reference to a cross section of the diffuser plate, and
wherein the diffuser plate includes a planation surface at a predetermined interval from the guide panel exposed between each pair of adjacent convex pattern and auxiliary pattern.

2. The backlight unit of claim 1, wherein the guide panel includes an inclined portion disposed at a predetermined angle with respect to a lower surface of the bottom cover, a horizontal portion disposed in parallel with the lower surface of the bottom cover, and a vertical portion disposed vertically with respect to the lower surface of the bottom cover.

3. The backlight unit of claim 2, wherein the reflecting portion is disposed on the inclined portion, and the convex pattern is disposed on the lower surface of the diffuser plate to maintain the interval between the guide panel and the diffuser plate.

4. The backlight unit of claim 2, wherein the reflecting portion is disposed on the inclined portion and the horizontal portion, and the convex pattern is disposed on the lower surface of the diffuser plate to maintain the interval between the reflecting portion and the diffuser plate.

5. The backlight unit of claim 2, wherein the convex pattern is disposed at an area on the lower surface of the diffuser plate that corresponds to an area where the diffuser plate is supported by the horizontal portion.

6. A backlight unit, comprising:
a bottom cover;
light sources in the bottom cover;
a guide panel on an outer circumference of the bottom cover;
a diffuser plate supported by the guide panel;
a convex pattern disposed on a lower surface of the diffuser plate to maintain an interval between the guide panel and the diffuser plate; and
an auxiliary pattern disposed on the lower surface of the diffuser plate configured to scatter light irradiated from the light sources, the auxiliary pattern having a smaller size than that of the convex pattern,
wherein the convex pattern and the auxiliary pattern are alternately arranged on the lower surface of the diffuser plate with reference to a cross section of the diffuser plate, and
wherein the diffuser plate includes a planation surface at a predetermined interval from the guide panel exposed between each pair of adjacent convex pattern and auxiliary pattern.

7. The backlight unit of claim 6, wherein the guide panel includes an inclined portion disposed at a predetermined angle with respect to a lower surface of the bottom cover, a horizontal portion disposed in parallel with the lower surface of the bottom cover, and a vertical portion disposed vertically with respect to the lower surface of the bottom cover.

8. A liquid crystal display device, comprising:
a backlight unit including:
a bottom cover;
a plurality of light sources in the bottom cover;
a guide panel on an outer circumference of the bottom cover;
a reflecting portion on at least one of the bottom cover and the guide panel and configured to reflect light from the light sources;
a diffuser plate supported by the guide panel;
a liquid crystal panel configured to display an image using light irradiated from the backlight unit;
a convex pattern disposed on a lower surface of the diffuser plate to maintain an interval between the diffuser plate and the guide panel or the reflecting portion; and
an auxiliary pattern disposed on the lower surface of the diffuser plate configured to scatter light irradiated from the light sources, the auxiliary pattern having a smaller size than that of the convex pattern,
wherein the convex pattern and the auxiliary pattern are alternately arranged on the lower surface of the diffuser plate with reference to a cross section of the diffuser plate, and
wherein the diffuser plate includes a planation surface at a predetermined interval from the guide panel exposed between each pair of adjacent convex pattern and auxiliary pattern.

9. The liquid crystal display device of claim 8, wherein the liquid crystal panel is disposed on a vertical portion of the guide panel provided to surround a side of the diffuser plate.

10. A liquid crystal display device, comprising:
a backlight unit including:
a bottom cover;
light sources in the bottom cover;
a guide panel on an outer circumference of the bottom cover;
a diffuser plate supported by the guide panel;
a liquid crystal panel configured to display an image using light irradiated from the backlight unit;
a convex pattern disposed on a lower surface of the diffuser plate to maintain an interval between the guide panel and the diffuser plate; and
an auxiliary pattern disposed on the lower surface of the diffuser plate configured to scatter light irradiated from the light sources, the auxiliary pattern having a smaller size than that of the convex pattern,
wherein the convex pattern and the auxiliary pattern are alternately arranged on the lower surface of the diffuser plate with reference to a cross section of the diffuser plate, and
wherein the diffuser plate includes a planation surface at a predetermined interval from the guide panel exposed between each pair of adjacent convex pattern and auxiliary pattern.

11. The liquid crystal display device of claim 10, wherein the liquid crystal panel is disposed on a vertical portion of the guide panel provided to surround a side of the diffuser plate.

12. A backlight unit, comprising:
a bottom cover;
a plurality of light sources in the bottom cover;
a guide panel on an outer circumference of the bottom cover;
a reflecting portion on at least one of the bottom cover and the guide panel and configured to reflect light from the light sources;
a diffuser plate supported by the guide panel; and
a convex pattern disposed on an upper surface of the reflecting portion to maintain an interval between the diffuser plate and the guide panel or the reflecting portion,
wherein the guide panel includes an inclined portion disposed at a predetermined angle with respect to a lower surface of the bottom cover, a horizontal portion disposed in parallel with the lower surface of the bottom cover, and a vertical portion disposed vertically with respect to the lower surface of the bottom cover,
wherein the reflecting portion is disposed on the inclined portion and the horizontal portion, and the convex pattern is directly disposed on the upper surface in contact with the reflecting portion to maintain the interval between the reflecting portion and the diffuser plate.

13. The backlight unit of claim 12, wherein the convex pattern is disposed at an area on the upper surface of the reflecting portion that corresponds to an area where the diffuser plate is supported by the horizontal portion.

14. The backlight unit of claim 12, further comprising an auxiliary pattern disposed on the lower surface of the diffuser plate configured to scatter light irradiated from the light sources, the auxiliary pattern having a smaller size than that of the convex pattern.

* * * * *